United States Patent
Beasley et al.

[11] Patent Number: 6,154,126
[45] Date of Patent: Nov. 28, 2000

[54] VEHICLE SIGNALING SYSTEM

[75] Inventors: Jerry L. Beasley, Christiansburg; E. Scott Geller, Newport, both of Va.

[73] Assignee: Positive Driving Systems LLC, Blacksburg, Va.

[21] Appl. No.: 09/412,717

[22] Filed: Oct. 5, 1999

[51] Int. Cl.[7] .................................................. B60Q 1/26
[52] U.S. Cl. ........................ 340/468; 340/471; 340/472
[58] Field of Search .................................. 340/468, 471, 340/473, 472, 331

[56] References Cited

U.S. PATENT DOCUMENTS

| | | | |
|---|---|---|---|
| 1,269,246 | 6/1918 | Anello et al. | 340/468 |
| 1,898,655 | 2/1933 | Chauvet | 40/573 |
| 2,252,339 | 8/1941 | Baker | 362/231 |
| 2,272,212 | 2/1942 | Larson | 40/573 |
| 3,004,359 | 10/1961 | Pisciotta | 40/563 |
| 3,678,457 | 7/1972 | Lev | 340/468 |
| 4,124,842 | 11/1978 | Bachelor | 340/321 |
| 4,361,828 | 11/1982 | Hose | 340/468 |
| 4,431,984 | 2/1984 | Bileck | 340/468 |
| 4,864,754 | 9/1989 | Sangu | 40/593 |
| 4,928,084 | 5/1990 | Reiser | 340/479 |
| 4,974,354 | 12/1990 | Hembarook, Jr. | 40/546 |
| 5,347,261 | 9/1994 | Adell | 340/469 |
| 5,355,119 | 10/1994 | Pearlman | 340/468 |
| 5,412,892 | 5/1995 | Filippakis | 40/471 |
| 5,500,638 | 3/1996 | George | 340/468 |
| 5,574,428 | 11/1996 | Groover | 340/468 |
| 5,578,986 | 11/1996 | Isobe et al. | 340/475 |
| 5,636,462 | 6/1997 | Kleiman | 40/452 |
| 5,648,756 | 7/1997 | Zadok | 340/468 |
| 5,712,618 | 1/1998 | McKenna | 340/475 |
| 5,801,620 | 9/1998 | Ready | 340/438 |
| 5,886,627 | 3/1999 | Brady et al. | 340/471 |

*Primary Examiner*—Daniel J. Wu
*Assistant Examiner*—Sihong Huang
*Attorney, Agent, or Firm*—McGuireWoods LLP

[57] ABSTRACT

A communication system and a method for communicating simple coded messages from one vehicle to another are provided. The communication system includes a signaling module that includes a light source configured and placed so that the light source is visible to occupants of other vehicles. The system includes a control module in communication with the signaling module that is readily accessible to the driver or other occupant of a vehicle. Responsive to the selection of one of a series of possible messages by the driver or occupant, the control module causes the light source to turn on and off in a predetermined sequence of flashes. The predetermined sequence of flashes represents a code corresponding to the selected message. The messages associated with use of the communication system are selected for enhancement of safety and to avert the negative responses associated with road rage.

27 Claims, 2 Drawing Sheets

VEHICLE SIGNALING SYSTEM

BACKGROUND OF THE INVENTION

The present invention relates to message communication devices. More particularly, the present invention is directed to a system for displaying visually perceptible coded messages from a vehicle to occupants of other vehicles.

Drivers have long used simple intervehicular communication devices for alerting other drivers of impending action or danger. When used properly, such devices as turn signal lights, brake lights and horns provide convenient, low complexity message transmitters that help to maintain highway safety. These devices have failed, however, to avert the causes and problems associated with some drivers' erratic and sometimes irrational reactions to others' driving practices or discourtesy. This problem, commonly termed "road rage," has become a growing concern as highways have become more and more crowded.

The term "road rage" as used herein refers to the negative psychological reactions exhibited by drivers in a variety of driving circumstances. Particularly prevalent among these reactions are feelings of frustration, anger and helplessness.

SUMMARY OF THE INVENTION

The negative reactions associated with road rage can be combated by providing a way for the affected driver to exercise additional control over the driving environment. One way to provide additional control is to enhance the driver's ability to communicate with other drivers. In general, enhanced communication improves an individual's psychological state while driving. The ability to transmit such simple messages as "Please," "Thank you," and "I'm sorry" can boost the individual's sense of self-efficacy, personal control, optimism, and belonging.

The typical safety-related communication devices of today's vehicles do not have the flexibility to communicate even these simple messages. Other more complex communication devices such as electronic signs require the use of graphical media to convey messages that must be read by other drivers. These devices require that the receiving drivers be close enough and at a certain orientation to enable them to read the message. Moreover, these devices require that the concentration of the receiving driver be focused on the transmitter in order to comprehend the message. This diverts the receiving driver's attention from the driving environment and thus decreases safety.

There is thus a need for a system capable of conveying simple but psychologically beneficial messages from one vehicle to another. This system would provide an overall improvement in highway safety by reducing road rage through enhanced communication without significant distraction of either the sending or receiving drivers.

It is accordingly an object of the present invention to provide a device and method for communicating visually perceptible coded messages from one vehicle to another.

It is a further object of the present invention to provide a message signaling system usable by the driver of a vehicle to communicate with drivers of other vehicles, thereby avoiding the detrimental psychological and safety effects of road rage.

It is yet another object of the present invention that the signaling system include a flashable light source that is readily visible to occupants of other vehicles and that this source be used to transmit a simple flashing code to convey one of a series of messages.

It is yet another object of the present invention that the signaling system include a control module that is readily accessible to the driver and that permits easy activation of a particular message code by the driver.

It is a further object of the present invention that the code combinations and their corresponding messages be widely disseminated to the driving public.

In accordance with the present invention, a signaling system for communicating coded messages from a first vehicle to at least one other vehicle includes a signaling module configured for attachment to the first vehicle. The signaling module includes at least one light source configured for visibility to the at least one other vehicle when the at least one light source is attached to the first vehicle. The signaling module is further configured for selective periodic activation and deactivation of the at least one light source. A combination of one such activation and one such deactivation of the light source defines a flash. At least one predetermined message may be communicated to the at least one other vehicle using a predetermined sequence of flashes.

A signaling system according to the present invention further includes a control module having a control circuit for selectively initiating the predetermined sequence of flashes of the at least one light source. In this way, the at least one light source can be used to communicate the at least one predetermined message. The signaling system also includes an arrangement for communicating between the control circuit and the signaling module, whereby the predetermined sequence of flashes of the at least one light source may be initiated by the control module.

The predetermined sequence of flashes of the signaling system according to the present invention preferably comprises a predetermined number of flashes of substantially equal duration having substantially equal intervals therebetween. The control circuit may optionally include a timing circuit whereby the predetermined sequence may be repeated at substantially regular time intervals.

The arrangement for communicating between the control circuit and the signaling module preferably includes electrical wiring in electrical communication with the control circuit and the light source, whereby electrical signals may be used by the control circuit to initiate the predetermined sequence of flashes of the light source. Alternatively, the arrangement for communicating may include a radio frequency encoder operatively connected to the control circuit for transmitting an encoded command to the signaling module. In this embodiment, a receiving module is operatively connected to the signaling module and configured for receiving and decoding the encoded command. The predetermined sequence of flashes of the light source is initiated in response to the encoded command.

The light source of the signaling system according to the present invention preferably includes at least one incandescent lamp. Alternatively, the light source may include at least one light emitting diode. The control module preferably has at least one switch operatively connected to the control circuit. This at least one switch is operable by an occupant of the first vehicle for selective activation of the control circuit whereby the predetermined sequence of flashes may be initiated to communicate at least one predetermined message to another vehicle. The control module is preferably programmable for individual initiation of each of a plurality of predetermined sequences of flashes of the at least one light source. Each predetermined sequence corresponds to one of the at least one predetermined message. The control module preferably includes a plurality of switches, each of the switches being configured for selective activation of the control module for initiating a predetermined one of the plurality of predetermined sequences.

A signaling system according to the present invention preferably further includes a DC power source operatively connected to the control circuit by a power connector. The DC power source is preferably a vehicle battery in electrical communication with the vehicle cigarette lighter. The power connector is illustratively configured for receipt by the vehicle's cigarette lighter and for establishing electrical communication therewith.

The at least one predetermined message of the signaling system according to the present invention may be configured to communicate a message in response to a circumstance of a driving environment. The at least one predetermined message may alternatively be configured to communicate a request. The at least one predetermined message is illustratively configured to reduce the stress level of the occupant when the predetermined sequence corresponding to the predetermined message is initiated. The at least one predetermined message may be configured to reduce the stress level of an occupant of the at least one other vehicle when the predetermined sequence corresponding to the predetermined message is observed by the occupant of the at least one other vehicle.

A method of communicating a coded message from a first vehicle to an occupant of at least one other vehicle according to the present invention includes providing a signaling system having a light source attachable to the first vehicle. The light source is configured for selective periodic activation and deactivation. A combination of one activation and one deactivation of the light source defines a flash. The signaling system further includes a control module for selective initiation of at least one predetermined sequence of flashes of the light source. The at least one predetermined sequence defines a code and each said predetermined sequence corresponds to a predetermined message. The method of communicating further includes attaching the light source to the first vehicle so that the light source will be visible to the occupant of the at least one other vehicle in a driving environment. The method also includes activating the control module to initiate a selected one of the at least one predetermined sequence to communicate a corresponding message.

The light source provided in a method of communicating according to the present invention is illustratively at least one incandescent lamp. Alternatively, the light source may be at least one light emitting diode.

A method of communicating according to the present invention preferably further includes the step of providing an arrangement for communicating a translation of the predetermined sequence of flashes into the corresponding message. The arrangement for communicating a translation preferably includes a bumper sticker attached to the first vehicle. The bumper sticker preferably has visual indicia of the code and the translation printed thereon.

The step of activating the control module in a method of communicating according to the present invention may be initiated responsive to a circumstance of the driving environment. The corresponding message communicated by the method according to the present invention may be configured to communicate a request. The corresponding message is illustratively configured to reduce the stress level of an occupant of the first vehicle when initiated by the occupant. The corresponding message may be configured to reduce the stress level of the occupant of the at least one other vehicle when the selected one of the at least one predetermined sequence is observed by the occupant of the at least one other vehicle.

The above embodiments achieve the objective of providing a simple communication system whereby both individual psychological well-being and overall highway safety are improved.

DESCRIPTION OF THE PREFERRED EMBODIMENTS

Figure 1:
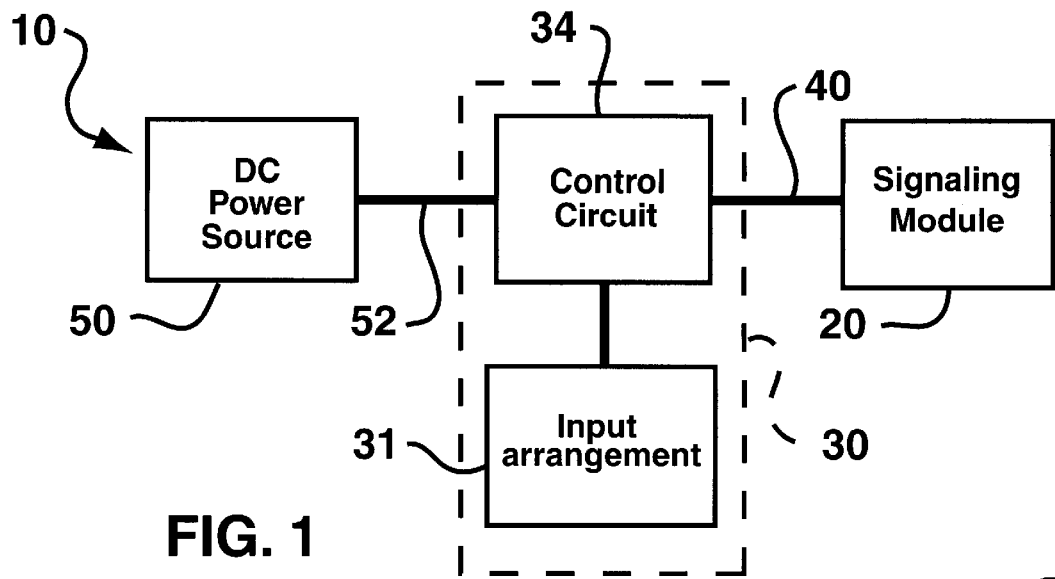
FIG. 1 is a schematic representation of a signaling system according to one exemplary embodiment of the present invention.

An exemplary embodiment of a signaling system 10 according to the present invention is illustrated schematically in FIG. 1. The signaling system 10 includes a signaling module 20, a control module 30 for selectively activating the signaling module 20, a communication arrangement 40 whereby the control module 30 communicates with and activates the signaling module 20, and a DC power source 50 for powering the signaling system. The control module 30 includes a control circuit 34 and an input arrangement 31 whereby the driver or other occupant of a vehicle may select a message for transmission. The DC power source 50 is electrically connected to the control module 30 by power connector 52.

The signaling system 10 transmits messages through the flashing of a light source disposed within the signaling module 20. The signaling module 20 is configured and installed in the user's vehicle so that the light source is easily visible to occupants of other vehicles. Messages are transmitted in the form of a code based on a sequence of flashes of the light source. In its simplest form, the code is based only on the number of flashes of the light source. A single flash, for example, could convey the message "Please," two flashes could convey the message "Thank you," and three flashes could convey the message "I'm sorry." These particular messages, though simple, have a significantly positive effect on the user's sense of control of the driving environment and therefore on his overall psychological well-being. These messages also provide insight to the receiver regarding the user's actions and state of mind. This serves to prevent misunderstanding and the consequent frustration and anger associated typically associated therewith.

For simplicity, the flashes are illustratively of regular duration and the intervals between successive flashes are preferably constant. Although not limited to a particular message duration, the system is effective using an overall message duration of one to two seconds. It will be apparent to those of ordinary skill in the art that more complex codes may be used that involve variations in the number and duration of flashes and in the interval between flashes. It will also be apparent that other messages may be associated with the code without departing from the spirit and scope of the present invention. The effectiveness of a particular message may be enhanced by periodic repetition of the complete message at regular intervals.

Figure 2:
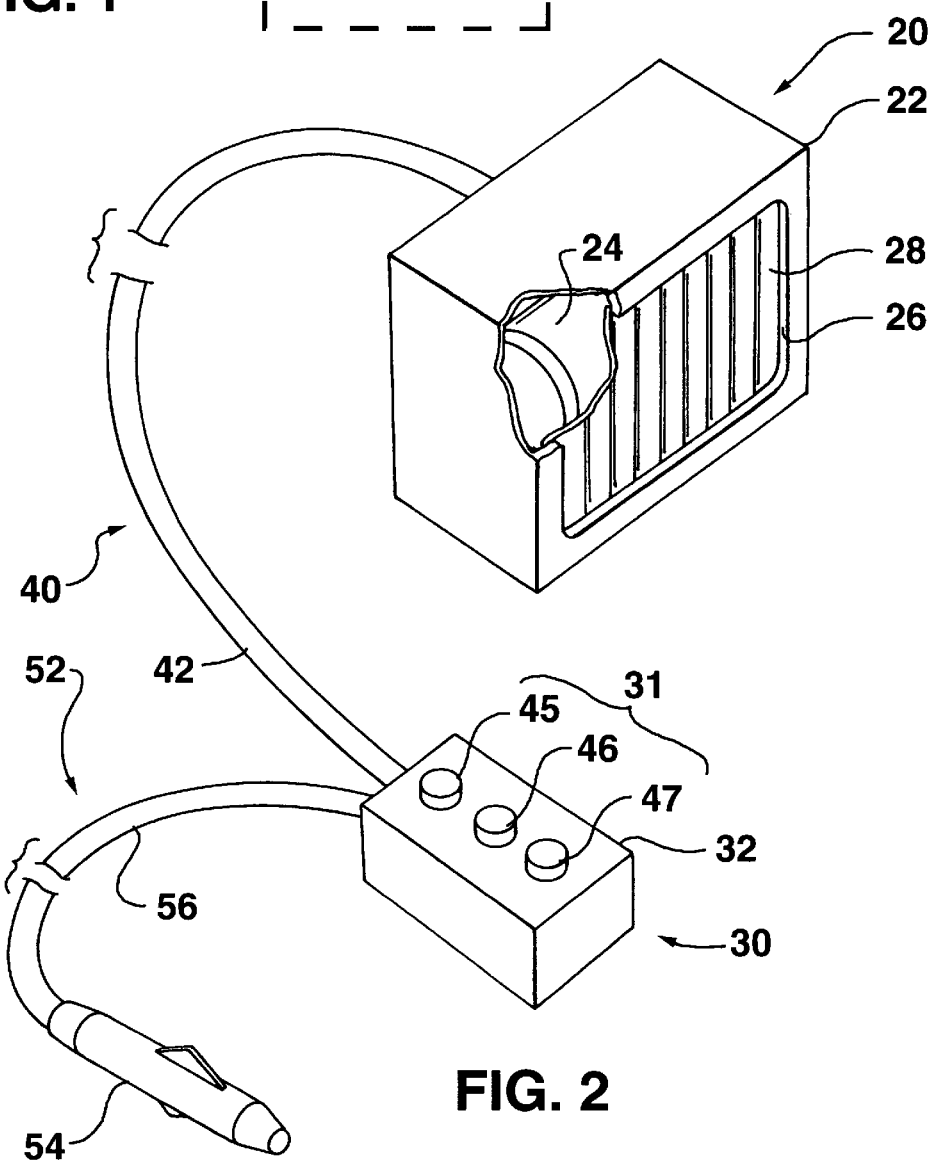
FIG. 2 is a perspective view of the signaling system illustrated in FIG. 1.

FIG. 2 illustrates a signaling module 20, a control module 30 and a power connecting arrangement 52 according to an exemplary embodiment of the present invention. The signaling module 20 includes a housing 22 in which is disposed a flashable incandescent lamp 24. It will be understood by those skilled in the art that any incandescent lamp or plurality of lamps, or any other suitable light source having sufficient visibility is suitable for use in the present invention. It will also be understood that the signaling system may use light emitting diodes as an alternative to incandescent lamps.

The housing 22 defines an aperture 26 through which light is emitted when incandescent lamp 24 is illuminated. A light transmitting lens 28 is positioned within the housing 22 so as to cover the aperture 26. The signaling module 20 is configured for positioning adjacent or against a window of a vehicle for light transmission therethrough.

The lens 28 may be translucent and may be configured so that the light transmitted through the lens 28 is a particular color. In order to avoid possible confusion with other signaling devices that typically transmit red, amber or white light, the lens 28 is preferably configured so that the transmitted light is green. It will be understood, however, that other colors may be used without departing from the spirit of the present invention.

Figure 3:
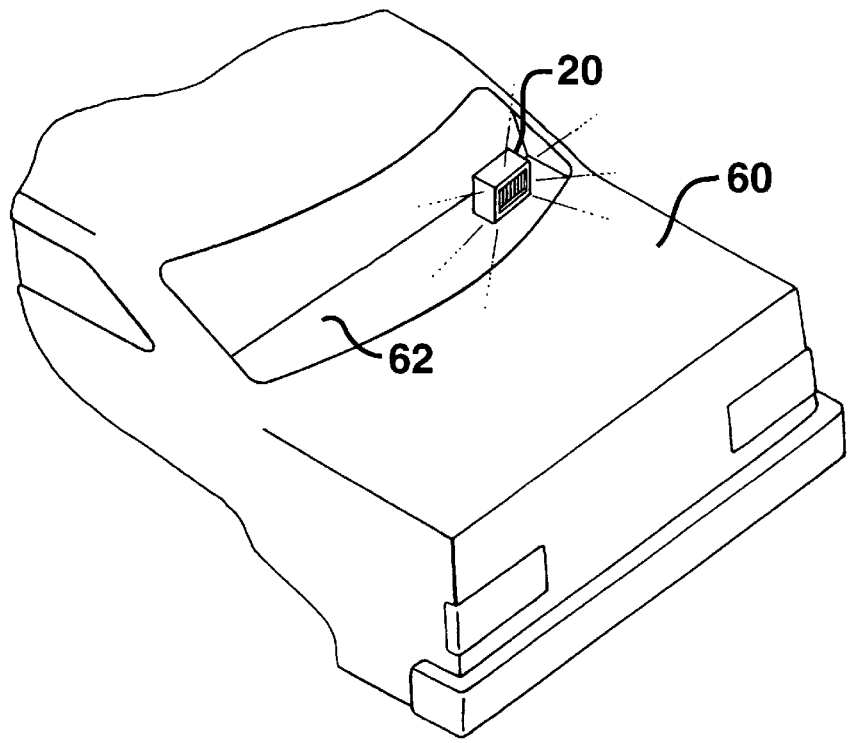
FIG. 3 is a perspective view of a signaling module of the signaling system illustrated in FIG. 1, wherein the signaling module is installed in a vehicle.

FIG. 3 illustrates a placement of the signaling module 20 on the rear window platform 62 of a vehicle 60 so that the illumination of the lamp 24 is visible to other vehicles, particularly those trailing the vehicle 60. The signaling module 20 may alternatively be attached to the exterior of the vehicle 60 or directly to the rear or other window of the vehicle 60. The signaling module 20 illustratively includes an attachment arrangement (not shown) including suction cups, hook-and-loop fasteners or other suitable fasteners for removable attachment of the signaling module 20 to a portion of a vehicle 60. It will be apparent that the signaling module 20 may be placed adjacent any window in the vehicle 60 for visibility to vehicles in any direction.

The control module 30 includes a control box 32, which houses a control circuit 34 for selectively activating the signaling module 20 for transmission of a message code. The control circuit 34 is operatively connected to the input arrangement 31, which includes three manually operable buttons 45, 46, 47 that control associated, normally open switches in the control circuit 34. The three buttons 45, 46, 47 are mounted to the switch box 32 for easy access by the driver or other occupant of the vehicle. Pressing one of the buttons 45, 46, 47 causes the activation of the signaling module 20 to flash the lamp 24 one or more times. In the preferred embodiment, a first one of the buttons 45, 46, 47 causes the lamp 24 to flash once, a second one of the buttons 45, 46, 47 causes the lamp 24 to flash twice and a third one of the buttons 45, 46, 47 causes the lamp 24 to flash three times.

It will be understood by those of ordinary skill in the art that a variety of input switch configurations may be used such as slide or toggle switches. It will also be understood by those skilled in the art that the circuitry used in the present invention is conventional and the necessary components are readily available at low cost.

In an alternative embodiment (not shown), the control circuit 34 includes only a single normally open switch and the circuit is configured so that the lamp 24 is activated when the switch is closed and deactivated when the switch is open. The switch is operable by a button that is biased in the open position so that the lamp 24 is activated when the button is pressed and deactivated when the button is released. This form of the present invention allows the user to transmit any desired sequence of flashes by manually pressing and releasing the button in a corresponding sequence.

In another alternative embodiment, the control circuit 34 includes a programmable portion that allows the user to program a particular flash sequence for association with and initiation by one of the buttons 45, 46, 47. It will be appreciated by those skilled in the art that additional switches may be used, thereby facilitating the use of more and higher complexity message codes. Alternatively, the control circuit 34 may be configured so that closure of two or more of the buttons 45, 46, 47 in combination may be used to initiate additional message codes.

In accordance with one illustrative embodiment, shown in FIG. 2, the signaling system 10 includes a power connecting arrangement 52 for connecting the control module 30 to the DC power source 50. The DC power source may be any suitable power source but is preferably a vehicle battery. In the embodiment illustrated in FIG. 2, the power connecting arrangement 52 includes a power connector 54 operatively connected to the control circuit 34 disposed in the switch box 32 using conventional electric wiring 56. The power connector 54 is configured for receipt by and electrical communication with a vehicle cigarette lighter socket.

The control module 30 is operatively connected to the signaling module 20 through a communication arrangement 40. As illustrated in FIG. 2, the communication arrangement 40 is composed of conventional electrical wiring 42 in electrical communication with the lamp 24 and the control circuit 34. When the signaling module 20 is to be activated, power from the DC power source 50 is channeled to the signaling module 20 by control circuit 34 through the electrical wiring 42 for illumination of lamp 24. It will be understood by those skilled in the art that a separate DC power source may be used to power the signaling module 20. In such an embodiment, the communication arrangement 40 would be used to transmit a signal to the signaling module 20 through the electrical wiring 42. Responsive to this signal, a switch in the signaling module 20 would be closed to illuminate the lamp 24 using power from the separate power source, which may be housed in the housing 22 of the signaling module.

Figure 4:
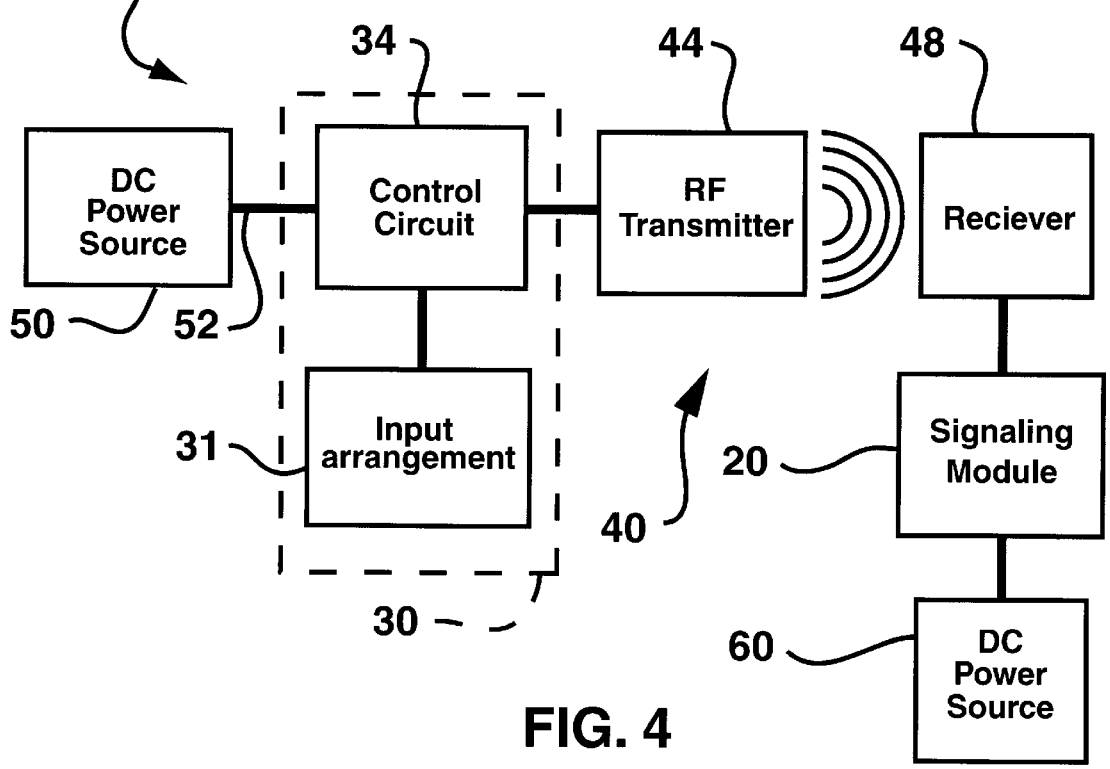
FIG. 4 is a schematic representation of a signaling system according to one exemplary embodiment of the present invention.

In another embodiment, illustrated schematically at 110 in FIG. 4, the control circuit 34 communicates with the signaling module 20 by radio transmission rather than through direct electrical communication. In this embodiment, the communication arrangement 40 includes a radio frequency transmitter 44 in electrical communication with the control circuit 34 and a receiver 48 in electrical communication with the lamp 24 of the signaling module 20. Because the signaling module 20 is not in electrical communication with the control module 30, the signaling module 20 requires a separate DC power source 60 in electrical communication with the lamp 24 and the receiver 48. The separate DC power source 60 is illustratively a battery that may be disposed within the housing 22 of the signaling module 20. Alternatively, the signaling module 20 may be provided separate access to the same DC power source 50 as the control module 30. When activation of the signaling module 20 is required, the control circuit 34 activates the transmitter 44 which sends a command signal to the receiver 48. The command signal is transmitted at a substantially unique frequency receivable by the receiver 48. Responsive to a command at the proper frequency, the receiver 48 causes the lamp 24 to illuminate. The transmitter and receiver arrangement may be configured so that the lamp 24 will remain illuminated until the transmitter 44 ceases to transmit the signal. Alternatively, the arrangement may be configured so that the lamp 24 will remain illuminated until the transmitter 44 transmits a second command signal.

It will be understood by those skilled in the art that the present invention may be adapted for use with a plurality of signaling modules 20 in association with one command module 30. This would permit the use of one signaling system 10 to transmit visual messages in multiple directions. Alternatively, a light source capable of providing illumination in multiple directions could be used in place of the unidirectional signaling module 20. This type of light source, if properly configured, could be mounted in the interior of a vehicle but would preferably be mounted to the exterior of the vehicle.

The signaling system 10 is used by installing the signaling module 20 in a vehicle in a position where it will be visible to occupants of other vehicles with whom the user may wish to communicate. For a single, unidirectional signaling module 20, the preferred location is adjacent the rear window of the vehicle as illustrated in FIG. 3. The control module 30 may be placed anywhere within easy reach of the driver or other occupants of the vehicle. When the user encounters a driving circumstance wherein communication of a message is desirable, the user presses the button on the control module 30 corresponding to the message he wishes to send. The control module 30 then causes the lamp 24 to flash the appropriate code associated with this message.

An additional aspect of the present invention is the conveyance of understanding of the code used by the invention to other drivers and to the driving public. Toward this end, the present invention is preferably provided with graphical translations of the code for use in educating drivers regarding the use of the signaling system and the code in traffic. These translations may be provided in the form of bumper stickers provided with the signaling system 10. These bumper stickers may be applied to the bumper of the vehicle in which the system is to be installed. It is preferable, however, that drivers be educated regarding the code when they are not in the driving environment. Accordingly, the signaling system 10 may be provided to a user along with an educating sun shield for placement inside the windshield of a vehicle when parked. The sun shield may include a graphical translation of the code printed on it. Other printed media such as window decals may also be provided. The code could also be publicized through the use of public service or paid advertising. The simplicity of the code simplifies the education process. Further, the widespread use of the code would eventually make the process of the invention virtually self-sustaining.

The signaling system of the present invention provides an inexpensive, low complexity way for a driver to relay a simple but important message to the driver of another vehicle in order to: a) improve the safety of the driving context, b) reduce the probability of negative emotions, and c) increase the probability of positive emotions. Using the signaling system facilitates a decrease in feelings of frustration, anger, and helplessness that many drivers experience in a variety of vehicular encounters. This is accomplished by providing these drivers with a way to actively care for their own and others' safety. More specifically, using the present invention improves an individual's psychological state while driving, and in particular, the personality dimensions of self-efficacy, personal control, optimism, and a sense of belonging. Moreover, the present invention can teach and support a spirit of interdependency among the drivers on our nation's highways, which, in turn, increases safety by decreasing the negative emotions associated with road rage.

The signaling system of the present invention presents a significant advantage over devices that allow intervehicular communication using a graphical display. Interpreting a graphical display requires significant focus and concentration of the receiver, thus removing focus and concentration from the road. In addition, display size constraints require that the receiving driver be relatively close to the transmitting vehicle in order for the message to be properly interpreted. This can result in tailgating, thus making the device detrimental to safety, rather than advantageous to safety. The signaling system of the present invention does not require the direct focus of the receiving driver. The flashing of the light source of the signaling module is perceptible even by the peripheral vision of the receiving driver. When the simplest code form is used, the receiver need only register the number of flashes and need not remove his attention from the road.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its exemplary embodiments, it is to be understood that this disclosure is only illustrative and exemplary of the present invention and is made merely for purposes of providing a full and enabling disclosure of the invention. The foregoing disclosure is not intended to limit nor is it to be construed to limit the present invention or otherwise to exclude any such other embodiments, adaptations, variations, modifications and equivalent arrangements, the present invention being limited only by the claims and the equivalents thereof.

What is claimed is:

1. A signaling system for communicating coded messages from a first vehicle to at least one other vehicle, said signaling system comprising:

a signaling module configured for attachment to said first vehicle and including at least one light source configured for visibility to said at least one other vehicle when said at least one light source is attached to said first vehicle, said signaling module being further configured for selective periodic activation and deactivation of said at least one light source, wherein a combination of one said activation and one said deactivation of said light source defines a flash and whereby at least one of a plurality of predetermined messages may be communicated to said at least one other vehicle using a predetermined sequence of flashes that includes a predetermined number of flashes;

a control module having a control circuit for selectively initiating said predetermined sequence of flashes of said at least one light source to communicate said at least one of a plurality of predetermined messages;

means for communicating between said control circuit and said signaling module, whereby said predetermined sequence of flashes of said at least one light source may be initiated by said control module; and a sign attached to said first vehicle, said sign having a fixed visual indicia printed thereon for communicating a translation of said predetermined sequence of flashes into a corresponding one of said at least one of a plurality of predetermined messages.

2. A signaling system according to claim 1 wherein each said predetermined sequence comprises a different number of flashes from each other predetermined sequence and said flashes are of substantially equal duration with substantially equal intervals therebetween.

3. A signaling system according to claim 1 wherein said control circuit includes a timing circuit whereby said predetermined sequence may be repeated at substantially regular time intervals.

4. A signaling system according to claim 1 wherein said means for communicating includes electrical wiring in electrical communication with said control circuit and said light source, whereby electrical signals may be used by said control circuit to initiate said predetermined sequence of flashes of said light source.

5. A signaling system according to claim 1 wherein said means for communicating includes a radio frequency encoder operatively connected to said control circuit for transmitting an encoded command to said signaling module and a receiving module operatively connected to said signaling module and configured for receiving and decoding said encoded command, said predetermined sequence of flashes of said light source being initiated responsive to said encoded command.

6. A signaling system according to claim 1 wherein said light source includes at least one incandescent lamp.

7. A signaling system according to claim 1 wherein said light source includes at least one light emitting diode.

8. A signaling system according to claim 1 wherein said control module has at least one switch operatively connected to said control circuit that is operable by an occupant of said first vehicle for selective activation of said control circuit whereby said predetermined sequence of flashes is initiated to communicate said one of a plurality of predetermined messages to said other vehicle.

9. A signaling system according to claim 8 wherein said control module includes a plurality of switches, each one of said plurality of switches being configured for selective activation of said control module for initiating a predetermined one of said plurality of predetermined messages.

10. A signaling system according to claim 1 wherein said control module is programmable for individual initiation of each of a plurality of predetermined sequences of flashes of said at least one light source, each said predetermined sequence corresponding to one of said plurality of predetermined messages.

11. A signaling system according to claim 1 further including a DC power source operatively connected to said control circuit by a power connector.

12. A signaling system according to claim 11 wherein said DC power source is a vehicle battery in electrical communication with a vehicle cigarette lighter and said power connector is configured for receipt by said vehicle cigarette lighter and for establishing electrical communication therewith.

13. A signaling system according to claim 1 wherein said at least one of said plurality of predetermined messages is configured to communicate a response to a circumstance of a driving environment.

14. A signaling system according to claim 1 wherein said at least one of said plurality of predetermined messages is configured to communicate a request.

15. A signaling system according to claim 1 wherein said at least one of said plurality of predetermined messages is configured to reduce a stress level of said occupant when said predetermined sequence corresponding to said predetermined message is initiated.

16. A signaling system according to claim 1 wherein said at least one of said plurality of predetermined messages is configured to reduce a stress level of an occupant of said at least one other vehicle when said predetermined sequence corresponding to said predetermined message is observed by said occupant of said at least one other vehicle.

17. A signaling system according to claim 1 wherein said sign is configured to communicate said translation to an occupant of said at least one other vehicle.

18. A signaling system according to claim 1 wherein said sign is configured to communicate said translation when said vehicle is not in use.

19. A signaling system according to claim 1 wherein said sign is a sticker adhered to a portion of said first vehicle.

20. A method of communicating a coded message from a first vehicle to an occupant of at least one other vehicle, said method of communicating comprising the steps of:

providing a signaling system having a light source attachable to said first vehicle, said light source being configured for selective periodic activation and deactivation, wherein a combination of one said activation and one said deactivation of said light source defines a flash, and having a control module for selective initiation of one of a plurality of predetermined sequences of flashes of said light source, said plurality of predetermined sequences defining a code with each said predetermined sequence including a predetermined number of flashes and corresponding to a predetermined message;

attaching to said first vehicle a sign having a fixed visual indicia of said code printed thereon for communicating a translation of said one of a plurality of predetermined sequences of flashes into said corresponding predetermined message;

attaching said light source to said first vehicle so that said light source will be visible to said occupant of said at least one other vehicle in a driving environment; and activating said control module to initiate said one of a plurality of predetermined sequences to communicate a corresponding message.

21. A method of communicating a coded message according to claim 20 wherein said light source includes at least one incandescent lamp.

22. A method of communicating a coded message according to claim 20 wherein said light source includes at least one light emitting diode.

23. A method of communicating a coded message according to claim 22 wherein said sign is a sticker adhered to a portion of said first vehicle.

24. A method of communicating a coded message according to claim 20 wherein said step of activating said control module is initiated responsive to a circumstance of said driving environment.

25. A method of communicating a coded message according to claim 20 wherein said corresponding message is configured to communicate a request.

26. A method of communicating a coded message according to claim 20 wherein said corresponding message is configured to reduce a stress level of said first occupant when said selected one of said at least one predetermined sequence is initiated by said first occupant.

27. A method of communicating a coded message according to claim 20 wherein said corresponding message is configured to reduce a stress level of said occupant of said at least one other vehicle when said selected one of said at least one predetermined sequence is observed by said occupant of said at least one other vehicle.

* * * * *